US007038414B2

(12) United States Patent
Daniels et al.

(10) Patent No.: US 7,038,414 B2
(45) Date of Patent: May 2, 2006

(54) VEHICLE CLOSURE ANTI-PINCH ASSEMBLY HAVING A NON-CONTACT SENSOR

(75) Inventors: Andrew R. Daniels, Newmarket (CA); Thomas P. Frommer, Mount Albert (CA); Mirko Pribisic, North York (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 10/343,404

(22) PCT Filed: Aug. 3, 2001

(86) PCT No.: PCT/CA01/01122

§ 371 (c)(1), (2), (4) Date: Apr. 15, 2003

(87) PCT Pub. No.: WO02/12669

PCT Pub. Date: Feb. 14, 2002

(65) Prior Publication Data

US 2003/0151382 A1 Aug. 14, 2003

Related U.S. Application Data

(60) Provisional application No. 60/223,106, filed on Aug. 3, 2000.

(51) Int. Cl.

| | |
|---|---|
| ***G05B 5/00*** | (2006.01) |
| ***G05D 3/00*** | (2006.01) |
| ***H02H 7/08*** | (2006.01) |
| ***H02P 1/04*** | (2006.01) |
| ***H02P 3/00*** | (2006.01) |

(52) U.S. Cl. ...................... 318/466; 318/286; 318/453; 318/467; 318/468; 49/26

(58) Field of Classification Search ........ 318/466–470, 318/280–286, 453, 484
See application file for complete search history.

(56) References Cited

U.S. PATENT DOCUMENTS 3,651,389 A 3/1972 Ito et al.
4,453,112 A 6/1984 Sauer et al.
4,458,445 A 7/1984 Sauer et al.

(Continued)

FOREIGN PATENT DOCUMENTS

DE 40 04 353 A1 2/1990

(Continued)

*Primary Examiner*—Marlon T. Fletcher
*Assistant Examiner*—Renata McCloud
(74) *Attorney, Agent, or Firm*—Clark Hill PLC

(57) ABSTRACT

An anti-pitch assembly is used in combination with a closure device of a motor vehicle. The closure device includes a closure panel, i.e., a windowpane or door, and a motor for moving the closure panel between an open position and a closed position. In the closed position, the closure panel covers an aperture, i.e., a window or door opening, of the motor vehicle. The anti-pinch assembly includes a position sensor that is disposed adjacent the motor or the closure device. The position sensor generates a position signal indicative of the position of the closure panel. A capacitive sensor measures the capacitance of a field extending through the aperture. The capacitive sensor generates a signal therefrom. A controller is electrically connected to the position and capacitive sensors. The controller receives the position and capacitive signals and transmits a signal to the motor to prevent the motor from moving the closure panel toward the closed position when the output signals deviates from a series of predetermined values for more than a predetermined period of time.

5 Claims, 3 Drawing Sheets

U.S. PATENT DOCUMENTS

| | | | | | |
|---|---|---|---|---|---|
| 4,943,757 | A | | 7/1990 | Richter et al. | |
| 4,944,116 | A | | 7/1990 | Mewald | |
| 5,074,073 | A | | 12/1991 | Zwebner | |
| 5,191,268 | A | | 3/1993 | Duhame | |
| 5,326,967 | A | | 7/1994 | Herrmann et al. | |
| 5,334,876 | A | | 8/1994 | Washeleski et al. | |
| 5,422,551 | A | | 6/1995 | Takeda et al. | |
| 5,610,484 | A | * | 3/1997 | Georgin | 318/286 |
| 5,621,290 | A | | 4/1997 | Heller et al. | |
| 5,714,853 | A | | 2/1998 | Knab et al. | |
| 5,730,165 | A | | 3/1998 | Philipp | |
| 5,734,245 | A | * | 3/1998 | Terashima et al. | 318/453 |
| 5,955,854 | A | | 9/1999 | Zhang et al. | |
| 6,002,228 | A | | 12/1999 | Knab | |
| 6,051,945 | A | | 4/2000 | Furukawa | |
| 6,051,981 | A | * | 4/2000 | Gershenfeld et al. | 324/663 |
| 6,114,820 | A | | 9/2000 | Nishigaya | |
| 6,163,080 | A | | 12/2000 | Castellon | |
| 6,283,504 | B1 | * | 9/2001 | Stanley et al. | 280/735 |
| 6,297,609 | B1 | * | 10/2001 | Takahashi et al. | 318/484 |
| 6,305,123 | B1 | * | 10/2001 | Davies et al. | 49/26 |
| 6,337,549 | B1 | | 1/2002 | Bledin | |
| 6,347,482 | B1 | | 2/2002 | Takiguchi et al. | |
| 6,366,042 | B1 | | 4/2002 | Gerbetz | |
| 6,377,009 | B1 | * | 4/2002 | Philipp | 318/468 |
| 6,389,752 | B1 | | 5/2002 | Rosenau | |
| 6,404,158 | B1 | * | 6/2002 | Boisvert et al. | 318/469 |
| 6,667,562 | B1 | * | 12/2003 | Heinrich | 307/10.1 |

FOREIGN PATENT DOCUMENTS

| | | | |
|---|---|---|---|
| DE | 4036 465 | A1 | 5/1991 |
| DE | 4004353 | A1 | 8/1991 |
| DE | 44 16 803 | A1 | 11/1994 |
| WO | WO-89/08952 | | 9/1989 |
| WO | WO-01/14676 | A1 | 3/2001 |

* cited by examiner

VEHICLE CLOSURE ANTI-PINCH ASSEMBLY HAVING A NON-CONTACT SENSOR

This application claims the benefit of Provisional Application No. 60/223,106, filed Aug. 3, 2000.

FIELD OF THE INVENTION

The invention relates to an anti-pinch assembly for a closure system associated with an aperture of a motor vehicle. More specifically, the invention relates to an anti-pinch assembly for an aperture of a motor vehicle wherein the anti-pinch assembly includes a non-contact sensor.

DESCRIPTION OF THE RELATED ART

Motor vehicles typically have anti-pinch assemblies for closure devices used to selectively open and close an aperture. By way of example only, an aperture of a motor vehicle is found within a door or side and the closure device associated therewith is a window and its associated control mechanism. A non-exhaustive list of closure devices include door windows, sliding doors, lift-gates, deck-lids, sunroofs and the like.

The anti-pinch assemblies associated with these closure devices typically sense the presence of a foreign object in the path of the closure device by using characteristics such as motor current or a feedback device, such as a Hall effect sensor, tachometer and the like. These feedback devices sense an abnormal rate of change in the parameter being sensed relative to the normal or unobstructed operating characteristic of the closure device. Simple detection of obstructions based on motor speed or electrical current passing through the motor are inadequate due to the normally varying characteristics of these parameters through the full range of motion for the closure device.

U.S. Pat. No. 6,051,945, issued to Furukawa on Apr. 18, 2000, disclosure an anti-pinch assembly for a closure device. A CPU controls a motor that moves the windowpane between its open and closed positions. A Hall sensing device is positioned such that it can sense the velocity of the output shaft of the motor. To measure velocity, the Hall sensing device uses two Hall effect sensors that are disposed around the shaft of the motor. A magnet is secured to the shaft and provides the magnetic field required to operate the Hall effect sensors. Once the velocity of the shaft is measured, acceleration is derived and the force is calculated using the mass of the windowpane. This system requires the use of multiple sensors and calculations to correctly determine the presence of an object.

SUMMARY OF THE INVENTION

An anti-pinch assembly is used in combination with a closure device of a motor vehicle. The closure device includes a closure panel and a motor for moving the closure panel between an open position and a closed position. In the closed position, the closure panel covers an aperture of the motor vehicle. The anti-pinch assembly includes a position sensor that is disposed adjacent the motor of the closure device. The position sensor generates a position signal indicative of the position of the closure panel. A capacitive sensor is electrically connected to the motor and measures the capacitance through the aperture. The capacitive sensor detects a change in the fields through the aperture. A controller is electrically connected to the position and capacitive sensors. The controller receives the position and capacitive signals and transmits an obstacle signal to the motor to prevent the motor from moving the closure panel toward the closed position when the capacitive signals deviate from a series of predetermined values for more than a predetermined period of time.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
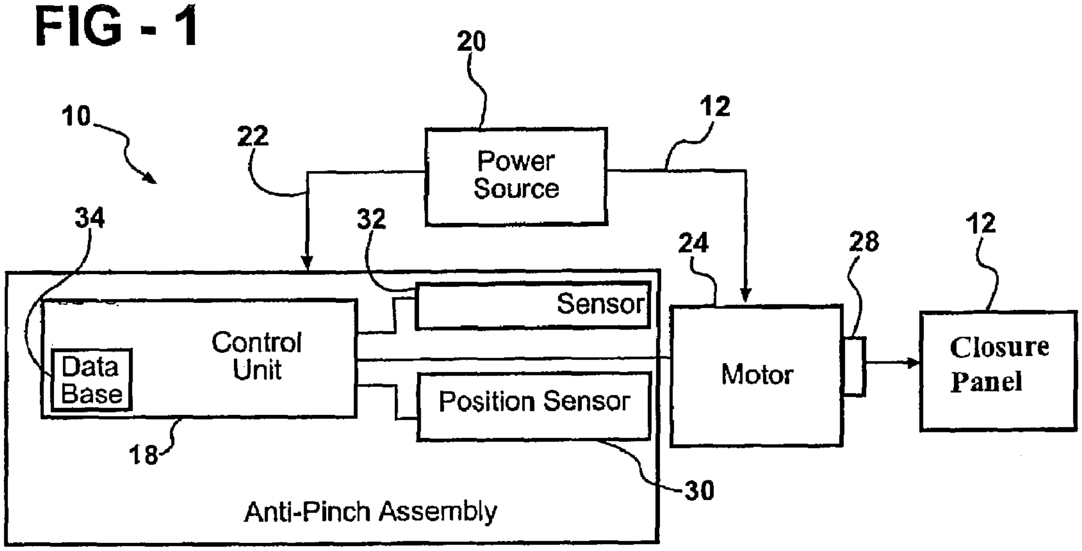
FIG. 1 is a schematic of one embodiment of the invention.

Referring to the FIGS. 1, an anti-pinch assembly is generally indicated at 10. The anti-pinch assembly 10 is used in conjunction with a closure device. The closure device is comprised of a closure panel 12 and its operating system, discussed subsequently. The anti-pinch assembly 10 prevents the closure panel 12 from pinching or crushing an obstruction or object (not shown) that may be extending through an aperture 14 of a motor vehicle 16 (both shown in FIG. 2). It should be appreciated by those skilled in the art that the closure panel 12 may be any motorized or automated structure that moves between an open position and a closed position. By way of example, a non-exhaustive list of closure panels 12 would include windowpanes, doors, lift-gates, sunroofs and the like. Apertures would include window frames, door openings, sunroof openings and the like.

The anti-pinch assembly 10 includes a control unit 18. The control unit 18 is electrically connected, directly or indirectly, to a power source 20. A conductor 22 graphically represents this connection. The power source 20 is the power source 20 for the motor vehicle 16. The power source 20 may be a battery, a generator or any other electricity generating device or combination thereof.

The control unit 18 is connected to a motor 24. The motor 24, receiving electricity through a conductor 26 that, directly or indirectly, extends between the power source 20 and the motor 24.

The motor 24 transforms the electrical energy into mechanical energy. More specifically, the electrical energy is transformed into a force that rotates a shaft 28 extending through the motor 24. The shaft 28 is operatively connected to the closure panel 12. The operative connection transforms the rotational energy output of the motor 24 into an axial or pivotal movement of the closure panel 12, depending on the particular design of the closure panel 12.

The control unit 18 receives inputs from two sensors 30, 32. The first sensor is a position sensor 30. The position sensor 30 identifies the position of the shaft 28 of the motor 24. As the shaft 28 rotates, the position sensor 30 identifies where along the rotation the shaft 28 is as well as how many rotations the shaft 28 has executed. The degree of accuracy is of the position sensor 30 is a variable that will depend on the specific design.

The position sensor 30 is preferably a Hall effect sensor that utilizes a single magnet (not shown) that is secured to the shaft 28. The magnet rotates with the shaft 28 and its magnetic field affects the position sensor 30 as it passes thereby.

Alternatively, the position sensor 30 may be a timer that provides an output signal indicative of the cycle time of the motor 24. Knowing the direction of the motor 24 and the cycle time, the control unit 18 can track the position of the shaft 28 which then correlates shaft position to closure panel position. A further alternative is a sensor mounted on the glass run channel which provides a signal responsive to closure panel position.

The second sensor is a non-contact sensor 32. The sensor 32 is defined as a non-contact sensor because an obstacle in the path of the closure panel 12 can be detected prior to the object contacting either the closure panel 12 or the frame defining the aperture 14. More specifically, the non-contact sensor 32 is a capacitive sensor 32. The capacitive sensor 32 is also disposed adjacent the motor 24. The capacitive sensor 32 detects changes in capacitance through the space defined by the aperture 14. The capacitance will not change substantially when the closure panel 12 moves therethrough due to design parameters. Changes occur prior to the immediate closing of the closure panel 12 and when an object extends therethrough. An object extending through the aperture 14 will disrupt the fields being measured by the capacitive sensor 32.

Figure 2:
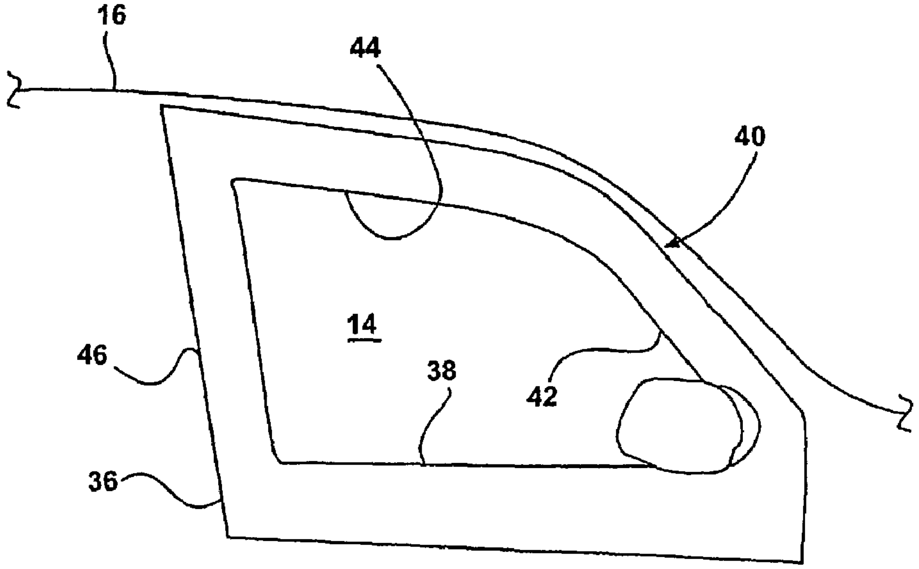
FIG. 2 is a side view of an aperture in a door of a motor vehicle incorporating one embodiment of the invention.

Referring to FIG. 2, a door 36 of a motor vehicle 16 is shown. In this embodiment, the door 36 is a standard side door that pivots about an axis (not shown) to move the door 36 between its open and closed positions.

The door 36 defines the aperture 14 (a window frame in this case) as an opening extending between a base 38 of the door 36 and around a window frame 40 having a forward boundary 42, an upper boundary 44 and a rearward boundary 46. The capacitive sensor 32 extends along the forward 42 and upper 44 boundaries. The capacitive sensor 32 is designed to measure the field directly therebelow within the aperture 14.

A reference map is generated for the signal, in this example a voltage, from the capacitive sensor 32 as a function of position of the shaft 28. The closure panel 12 is moved from the open position to the closed position. At each position interval, the signal from the capacitive sensor 32 and the position is recorded and saved in database 34.

Figure 3:
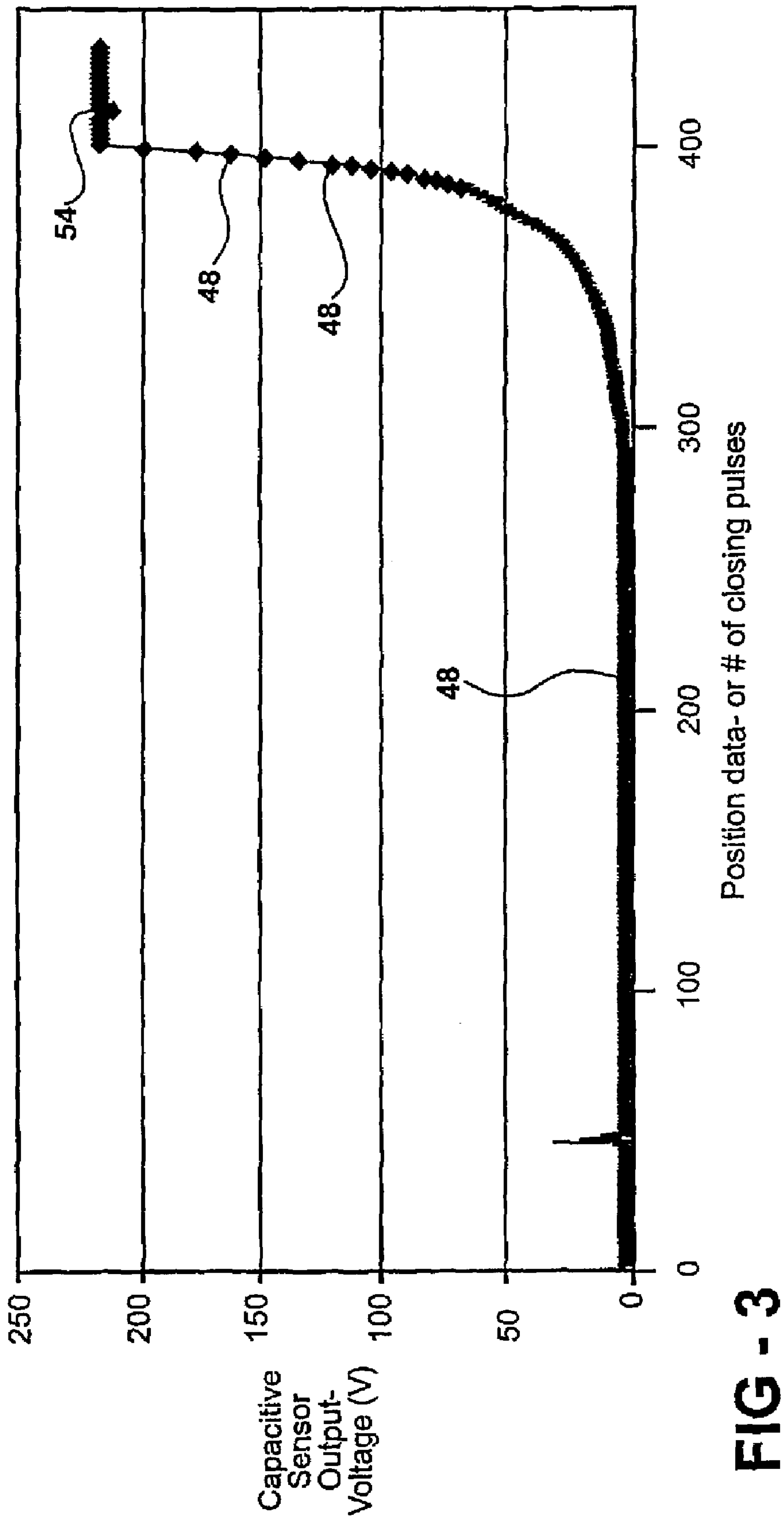
FIG. 3 is a graph of a reference map of data stored in a database utilized by one embodiment of the invention.

FIG. 3 is a graphic representation of this reference map. The reference map is a series of predetermined values 48 as function of closure panel 12 position and stored in a database 34. As is represented in FIG. 1, the database 34 is a two dimensional array and forms a part of the control unit 18. It should be appreciated by those skilled in the art that the database 34 may be stored in a device separate and unique from the control unit 18.

The reference map represents the baseline for which the determination of the presence of a foreign object or obstacle will be made. If a signal output from the capacitive sensor 32 at a particular position is substantially similar to that which is stored in the database 34, the anti-pinch assembly 10 will not alter the path of the closure panel 12.

Figure 4:
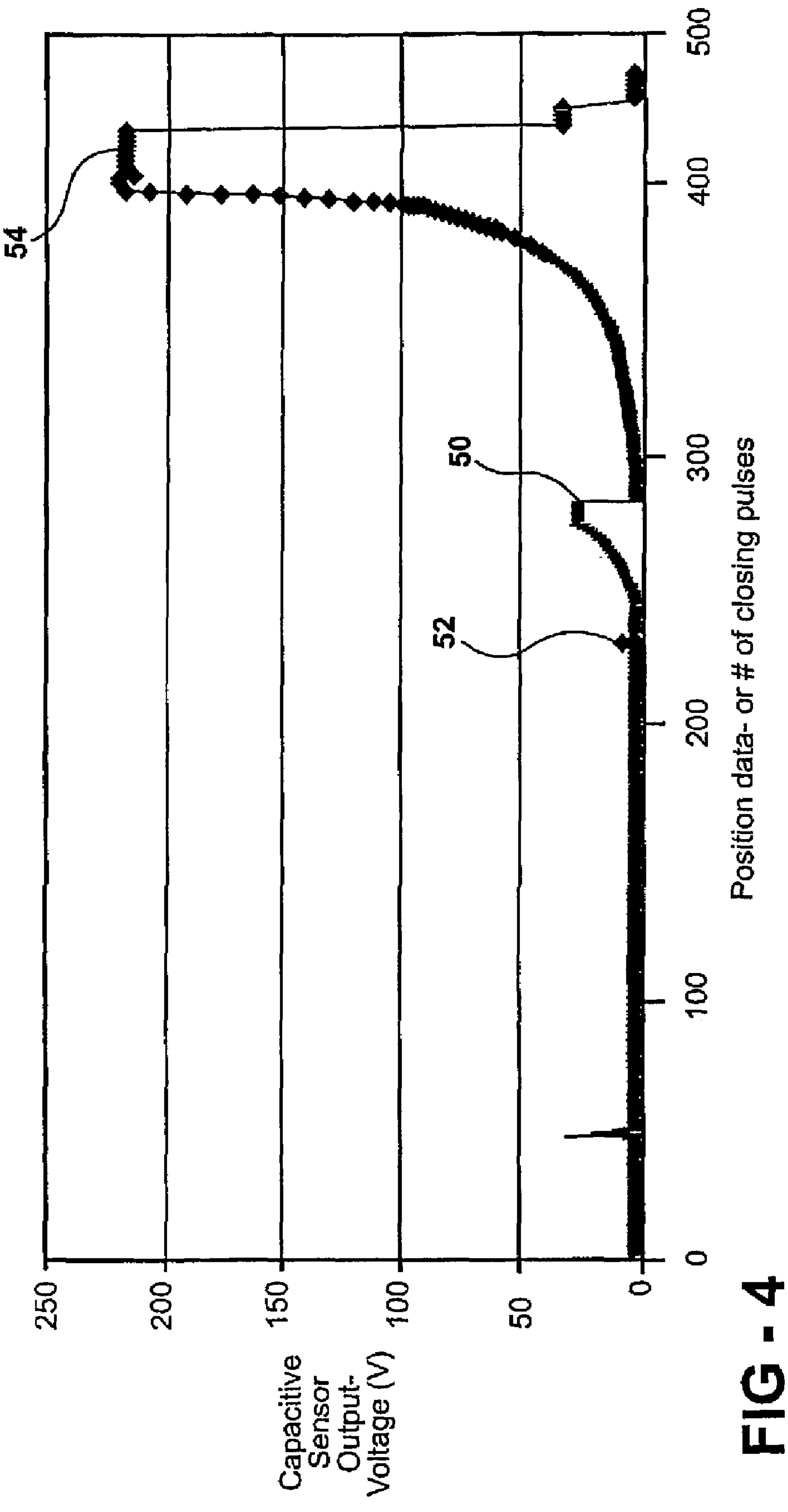
FIG. 4 is a graph of measured data when an object is extending through an aperture of the motor vehicle.

Referring to FIG. 4, an example of data measured when an object exists in the path of the closure panel 12 is shown. The output signal is measured over a period of time and each output value is correlated with a position value. The correlated data is mapped in FIG. 4. With the data shown in FIG. 4, an object is detected at 50. The pinching of the object between the closure panel 12 and either the forward boundary 42 or upper boundary 44 creates a change in signal value occurred prior to the defined and expected increase as shown in the reference map of FIG. 3. A comparator 45 measures the difference between the baseline value of FIG. 3 and the actual measurement of the output signal. The increase in output signal defines a compare value that is the difference between the measured signal and the signal value stored in the database 34 for that particular position in which the shaft 28 of the motor 24 is when the compare value was created.

When the output value of the signal differs from the reference map of FIG. 3 by a predetermined value for a specific period of time, an object is determined to be extending through the aperture 14 and will eventually be pinched if the closure panel 12 continues to move toward its closed position. Contrast this from a data point 52 generated from noise in the anti-pinch assembly 10. The noise 52 does not last for an extended period of time, nor does it differ from the data 48 of FIG. 3 by a compare value sufficient enough to be considered to be generated by a foreign object. The plateaus 54 in both FIG. 3 and FIG. 4 represent the end of travel for the closure panel 12.

When detection of an obstacle is made, an obstacle signal is generated and the control unit 18 responsively overrides the motor 24 and either stops it from operating or reverses the direction in which the shaft 28 is rotating. If the closure panel 12 is returned to its open position, the control unit 18 allows the motor 24 to operate according to normal operation. If the closure panel 12 remains in the same position, the anti-pinch assembly 10 will not allow the closure panel 12 to continue to its closed position until after the compare value is eliminated.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A method for preventing a closure panel from pinching an obstruction extending through an aperture of a motor vehicle having a motor to drive the closure panel between an open position and a closed position, a position sensor and a capacitive sensor, the method comprising the steps of: measuring a capacitance of a field extending through the aperture using the capacitive sensor as the motor drives the closure panel between the open and closed positions; generating a voltage signal from the capacitance sensor based on the capacitance measurements; identifying a position of the motor using the position sensor as the motor drives the closure panel between the open and closed positions; correlating the voltage measured to the position identified to create data; comparing the data to a reference map to create a compare value; and detecting an object in a path of the closure panel as the closure panel moves toward the closed position when the compare value exceeds a predetermined value; and measuring a time period that the compare value exceeds the predetermined value to distinguish the detection of the object from noise.

2. A method as set forth in claim 1 including the step of preventing the closure panel from continuing to move toward the closed position when the object is detected.

3. A method as set forth in claim 2 including the step of preventing the closure panel from continuing to move toward the closed position.

4. A method as set forth in claim 3 including the step of retracting the closure panel to the open position after the object has been detected.

5. A method as set forth in claim 1 including a step of generating said reference map by: measuring a capacitance of a field extending through the aperture using the capacitive sensor as the motor drives the closure panel between the open and closed positions in absence of an obstacle impeding travel of said closure panel; generating a voltage signal from the capacitance sensor based on the capacitance measurements; identifying a position of the motor using the position sensor as the motor drives the closure panel between the open and closed positions; correlating the voltage measured to the position identified; and storing said voltage and position data.

* * * * *